United States Patent [19]

Law

[11] Patent Number: 5,724,221
[45] Date of Patent: Mar. 3, 1998

[54] DIRECT CONTACT VARISTOR ASSEMBLY

[75] Inventor: Perry Law, Centerville, Utah

[73] Assignee: EFI Electronics Corporation, Salt Lake City, Utah

[21] Appl. No.: 594,644

[22] Filed: Feb. 2, 1996

[51] Int. Cl.$^6$ .................................................. H02H 1/00
[52] U.S. Cl. ........................... 361/127; 361/56; 361/111
[58] Field of Search ........................... 361/56, 111, 117, 361/118, 91, 119, 126, 127; 338/21

[56] References Cited

U.S. PATENT DOCUMENTS

| | | | |
|---|---|---|---|
| 2,206,232 | 7/1940 | Martin | 19/288 |
| 3,601,632 | 8/1971 | Frazier | 327/526 |
| 3,648,166 | 3/1972 | Redecker et al. | 324/110 |
| 3,894,274 | 7/1975 | Rosenberry, Jr. | 361/23 |
| 3,914,657 | 10/1975 | Melanson | 361/117 |
| 3,987,343 | 10/1976 | Cunningham et al. | 361/118 |
| 4,152,743 | 5/1979 | Comstock | 361/56 |
| 4,296,398 | 10/1981 | McGalliard | 361/104 |
| 4,335,415 | 6/1982 | Hooberry | 361/104 |
| 4,439,806 | 3/1984 | Brajder | 361/98 |
| 4,439,807 | 3/1984 | Reitz | 361/127 |
| 4,459,632 | 7/1984 | Nijman et al. | 361/56 |
| 4,502,089 | 2/1985 | Ozawa et al. | 361/127 |
| 4,509,095 | 4/1985 | Boros | 361/721 |
| 4,587,588 | 5/1986 | Goldstein | 361/54 |
| 4,689,597 | 8/1987 | Galloway et al. | 337/186 |
| 4,736,181 | 4/1988 | Dornauer | 337/203 |
| 4,740,859 | 4/1988 | Little | 361/56 |
| 4,809,124 | 2/1989 | Kresge | 361/111 |
| 4,901,187 | 2/1990 | Allina | 361/117 |
| 4,907,119 | 3/1990 | Allina | 361/56 |
| 4,918,421 | 4/1990 | Lawless et al. | 338/21 |
| 4,975,674 | 12/1990 | Sumiyoshi et al. | 361/117 |
| 5,006,950 | 4/1991 | Allina | 361/117 |
| 5,130,884 | 7/1992 | Allina | 361/117 |
| 5,140,491 | 8/1992 | Allina | 361/56 |
| 5,167,537 | 12/1992 | Johnescu et al. | 439/620 |
| 5,220,480 | 6/1993 | Kershaw, Jr. et al. | 361/117 |
| 5,369,543 | 11/1994 | Bonnesen et al. | 361/117 |
| 5,438,473 | 8/1995 | Allina | 361/118 |

*Primary Examiner*—Jeffrey A. Gaffin
*Assistant Examiner*—Ronald W. Seja
*Attorney, Agent, or Firm*—Thorpe, North & Western, LLP

[57] ABSTRACT

A varistor-based voltage suppression circuit is coupled to a power distribution system having at least one power line and at least one neutral line. A varistor is coupled directly to the power and neutral lines of the distribution circuit so that the electric current travels across at least one planar surface of the varistor, thus eliminating one or more leads from the distribution circuit to the varistor circuit. The suppression circuit may be a single varistor or a number of varistors in parallel with a number of lines in the distribution circuit.

25 Claims, 3 Drawing Sheets

DIRECT CONTACT VARISTOR ASSEMBLY

BACKGROUND

The present invention relates generally to voltage surge supressors and particularly to assemblies of varistors in direct contact with power distribution lines in a lead-less arrangement.

Sintered metal oxide varistors and other transient voltage protection advancements have lead to more complete protection of electrical equipment from voltage irregularities within a power distribution system. The term "varistor" is used herein to indicate a varistor of this sort and any other such component of similar design and performance characteristics such as a capacitative disk. The proliferation of increasingly sensitive devices such as microprocessor-based computing, office and communications equipment has lead to a corresponding demand for more effective devices to protect against power supply irregularities harmful to that equipment.

Such power line irregularities can result from such as lightning striking a line, relay switching, motor communicator cycling, contact arcing and other on/off events. Lightning events can produce over-voltages on the order of 10,000 times the tolerances of sensitive equipment.

The complexity, multiplicity and remoteness of power distribution systems suggests that voltage surge supressors be placed in large distribution systems as well as any micro distribution system in which any sensitive device is located. This has lead to a demand for devices which are increasingly effective in terms of cost and space. The increasing sophistication, and corresponding cost, has lead to a requirement that voltage surge supressors be more and more effective in eliminating all transient voltage irregularities.

Varistors are commonly used in voltage surge supressors by placing them in electrical connection on one side to the power source line of the distribution circuit, and on the other side to the power neutral or ground line. When a voltage exceeding the operative rating of the varistor occurs in the line, the resistance of the varistor changes to a more conductive state such that the over-voltage is directed away from the equipment constituting the load in the distribution circuit, into the neutral line. In such manner the varistor protects the equipment.

In more demanding applications it is known to engage a multiplicity of varistors and other surge protective devices in parallel. One varistor only has one set of operating characteristic such as a single operative threshold at which it changes resistance. A number of varistors in parallel provides the added advantage of multiple operating characteristics. Varistors have a limited pulse-life time which varies with the number and magnitude of over-voltage events sustained.

A typical physical arrangement of a multiple varistor surge protective circuit includes a lead to or contact point with a printed circuit board ("PCB") from the power supply line of the power distribution circuit, a common lead or trace to a parallel lead or trace for each varistor to a contact point at which a lead is taken off the PCB to one side of each varistor in parallel, a solder contact of the lead to each varistor, a solder contact on the other side of each varistor to a lead to the neutral side of the PCB, a contact to the PCB for each neutral side lead, parallel neutral leads or traces to a common neutral lead or trace on the PCB, and a lead to or contact point with the neutral line of the power distribution circuit. Each of these components have a resistance which adds to the total resistance to over-voltage across the varistor circuit. Hence, the varistor circuit in the protective or low resistance over-voltage mode is less effective.

As is set forth momentarily herein, the total resistance of all these components is higher than the necessary theoretical resistance of the Varistor in its fully conductive mode. At a theoretical amperage of 5,000 Amps and total a lead resistance in a typical circuit of 8.83 m$\Omega$, the voltage increase on the suppression circuit is an additional 44 volts.

A parallel array of 8 disc-shaped varistors in a typical PCB arrangement occupies approximately 32 CM$^3$. This, combined with the uncomplimentary planar space of the PCB combines to take up a relatively large amount of space in direct spacial competition with other electronic components. This spacial competition is particularly troubling in already complex environments such as desk space in office environments and enclosure space in distribution circuitry, communications and entertainment equipment environments. Large enclosures necessary to house parallel PCB configurations are also unsightly.

The various resistive components add to design variables that necessitate narrower tolerances in the threshold of the varistor to achieve the range of operational thresholds required to protect a given circuit. Also, the inductance caused by the leads of prior art devices can be significant. Inductance associated such systems is increased proportionally to the total lead length in the varistor circuit. In the event of very fast rising transients, even a small inductance can cause a large voltage drop in the circuit and cause the varistor to miss the transient which then passes into the distribution circuit, to the load, potentially causing damage to the load and/or its individual components.

To improve on the spacial problems described above, some manufacturers have attempted to decrease the distance between the varistors or to arrange them in original proximal relationships. This has variously resulted in elimination of a PCB, a separate enclosure for varistor assemblies and lengthy leads to and from source and neutral lines to the enclosure. These solutions have not resulted in significant space saving and have decreased the efficiency of the devices by increasing lead length and the resistance of the varistor circuit.

There is thus a need to provide a voltage suppressor configuration which reduces or eliminates lead components to and from the distribution circuit thereby reducing suppression circuit resistance, inductance, and design variables which must be made up by using more expensive varistors with closer operative tolerances. There is also a need to provide such a suppressor configuration in which varistors are compacted in a close proximal relationship to save space.

Those having ordinary skill in the art will appreciate that these and other needs are met by the present invention.

OBJECTS AND SUMMARY OF THE INVENTION

It is therefore an object of the present invention to provide a voltage suppressor configuration which reduces or eliminates lead components to and from the distribution circuit thereby reducing suppression circuit resistance, inductance, and performance variables which must be made up by using more expensive varistors with closer operative tolerances.

It is another object of the invention to provide such a suppressor configuration in which varistors are compacted in a close proximal relationship to save space.

The above objects and others not specifically recited are realized in specific illustrative embodiments of a voltage surge suppressor in which one or more lines of a power distribution circuit are in direct contact with one or more varistors such that in normal operation current in the circuit flows over a varistor surface so as to eliminate leads to the varistor.

In yet another illustrative embodiment of a voltage surge suppressor, multiple varistors are laminated together with alternating neutral contacts and source contacts in electrical connection therewith and therebetween.

BRIEF DESCRIPTION OF THE DRAWINGS

The above and other objects, features and advantages of the invention will become apparent from a consideration of the subsequent detailed description presented in connection with the accompanying drawings in which.

DETAILED DESCRIPTION OF THE PREFERRED EMBODIMENTS OF THE PRESENT INVENTION

Figure 1:
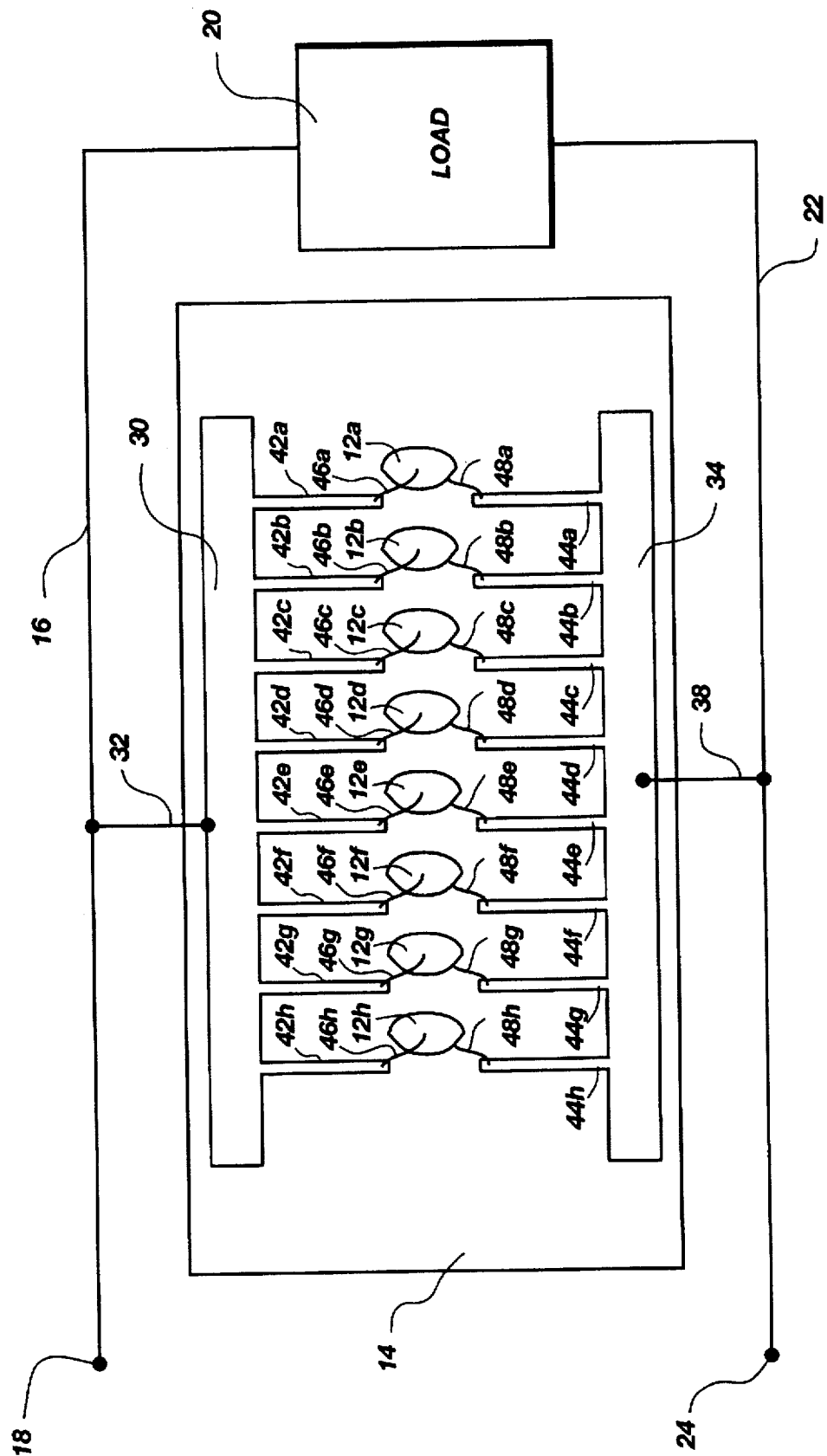
FIG. 1 is a plan view of a prior art voltage surge suppressor with varistors attached in parallel to a PCB and a distribution circuit in schematic.

Reference will now be made to the drawings wherein like structures will be provided with like reference numerals.

Referring to FIG. 1, there is shown, generally designated at 10, a prior art voltage surge suppressor with varistor elements 12a–12h attached in parallel to a PCB 14.

The distribution circuit of the prior art voltage surge suppressor of FIG. 1 is depicted in schematic. A power line 16 is connected to a power source at a power source terminal 18. The power line 16 leads through a load 20 to a neutral line 22 and eventually a neutral terminal 24. The power line 16 is connected to a power-side trace 30 on the PCB 14, by a power-side lead 32. Similarly, the neutral line 22 is connected to a neutral-side trace 34 on the PCB 14, by a neutral-side lead 38.

The varistor elements 12a–12h are connected in parallel to the varistor circuit by soldering power-side varistor leads 46a–46h between the varistors and corresponding power trace legs 42a–42h, and corresponding neutral-side varistor leads 48a–48h between the varistors and corresponding neutral trace legs 44a–44h. This completes the prior art varistor circuit such that over-voltage current travels from the power line 16 through the power-side lead 32, power-side trace 30, at least one power-side trace leg 42a–42h, at least one power-side varistor lead 46a–46h, at least one varistor 12a–12h, at least one neutral-side varistor lead 48a–48h, at least one neutral trace leg 44a–44h, the neutral-side trace 34 and the neutral-side lead 38. There are at least eight corresponding solder joints necessary to complete such a circuit.

Each of these elements adds a component of resistance to the circuit. For example, a typical resistance of the power-side lead 32 is about 2.1 mΩ; a typical resistance of the power-side trace 30 is about 1.0 mΩ; a typical resistance of a power-side trace leg 42a–42h is about 1.05 mΩ; a typical resistance of a power-side varistor lead 46a–46h is about 0.266 mΩ; a typical resistance of a neutral-side varistor lead 48a–48h is about 0.266 mΩ; a typical resistance of the a neutral trace leg 44a–44h is about 1.05 mΩ; a typical resistance of the neutral-side trace 34 1.0 mΩ; a typical resistance of the neutral-side lead 32 is about 2.1 mΩ and a typical resistance of the sum of the at least eight solder joints necessary to connect the circuit is 0.01 mΩ. The sum of these resistances totals about 8.9 mΩ. This does not account for the resistance of the varistor. Features such as fuses and diagnostic circuitry are often added but do not aid in an understanding of the invention and are, therefore not depicted.

In accordance with Ohms Law, the total added resistance of the typical prior art circuitry (8.9 mΩ) in a typical circuit operating at 5,000 Amps will result in an increase of 44.5 Volts in the performance of the prior art varistor circuit. It will be appreciated that this causes substantial loss of performance in the nature of added resistance, inductance and design variables.

Figure 2:
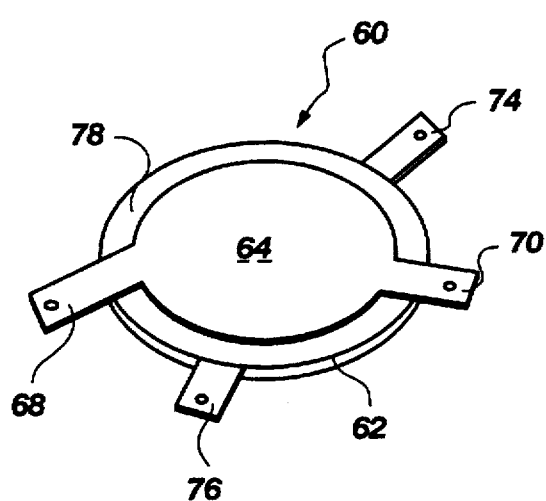
FIG. 2 is a perspective view of a voltage surge suppressor assembly made in accordance with the principles of the present invention.

Referring to FIG. 2, there is shown, generally designated at 60, a voltage surge protective circuit configuration having a wafer-shaped varistor 62 laminated between a power source contact 64 and a neutral contact (not numbered). The power source contact 64 has a power source contact tab at a first end 68 and a load contact tab at a second end 70. The power source contact tab 68 is in electrical contact with a power source line (not depicted) which is, in turn ultimately in connection with a power source. The power load contact tab 70 is in electrical connection with a source line leading to a load such as an electrical motor, computer equipment, communications equipment, televisions, etc. The power distribution system comprising a power source, load and neutral source will be more fully described in conjunction with FIG. 5. The electrical connections are made by soldering the tabs to the lines or by some other conventional method of connecting a line to a contact.

The neutral contact has a load neutral tab 74 at a first end, and a source neutral tab 76 at a second end. The load neutral tab 74 is connected to a line leading to the neutral side of a load and the source neutral tab 76 is connected to a line leading to a neutral source (the ultimate return to the power source). It will be appreciated that "neutral source" could as well refer to a ground or any other functionally similar means.

In this manner, normal current flows through the source lines and the source contact 64 to the load and from the load through the respective neutral lines and contact in a normal fashion when the distribution circuit is closed. It will be appreciated that the respective connections and contacts can be constructed such that there is virtually no change in the performance characteristics of the distribution circuit upon insertion of these components.

During over-voltage events, however, the varistor resistance decreases and the over-voltage current, depending on the performance characteristics of the varistor, flows from the power source to the neutral source, diverting the over-voltages from the potentially sensitive load.

The only non-varistor resistance factors in the inventive voltage surge suppressor circuit are the solder used to connect one varistor surface of the source contact 64 to a first surface 78 of the varistor 62 and the solder used to connect one surface of the neutral contact (not numbered) to a second surface (not numbered) of the varistor. The source and neutral contacts are relatively round so as to complement the planar surfaces of the wafer-shaped varistor 62. This further reduces any resistance inherent to the solder contacts necessary to the varistor circuit.

The elimination of the lengthy geometry of varistor circuit leads in the prior art results in a decrease in inductance in the varistor circuit. Inductance can be described in accordance with the formula v=L(dI/dt), where v is voltage, L is inductance in Henrys symbolized by "H", dI is the change in current and dt is the change in time.

When the change in current, or the transient, is slow, the dt is not a significant factor. For example at a change of 3000 Amps over 8 μs and an inductance of 0.001 μs, the voltage across the varistor circuit is 0.375v. A change of the dt from 8 to 5 ns (from a slow transient to a fast transient) changes the voltage in the same system to 600v. Thus we see that the present invention in which the inductance approaches zero has a significant advantage over the prior art. With an inductance approaching zero, the variability between the management of a fast transient and a slow transient is relatively non-existent.

The area of the contacts should be maximized without creating unnecessary overlap over the circumference of the varistor which could result in arcing of electrical current from the source contact 64 to the neutral contact (not numbered). Such arcing creates high frequency noise that can pass through the power distribution circuit and damage or disrupt sensitive electrical components of the types enumerated elsewhere herein. It is generally considered that a contact ratio wherein each power source contact is an electrical connection with between 40% and 95% of the first planar surface of a corresponding varistor is most advantageous. This is also the reason for staggering the respective tabs (68–76) to maximize the distance between them thus preventing arcing. The power source line may be paired proximal to load source line and the load neutral line may be paired proximal to the source neutral line to allow for conventional wiring in the physical direction necessary. This suggests a geometry in which the respective tabs are arranged in proximity, but far enough away to prevent arcing between any component of the source side with the neutral side of the circuit or with any other conductive component.

Figure 3:
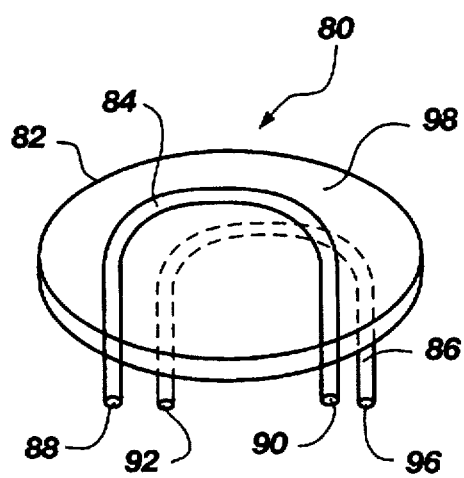
FIG. 3 is a perspective view of another voltage surge suppressor assembly made in accordance with the principles of the present invention.

Depicted in FIG. 3, there is shown, generally designated at 80, a voltage surge protective circuit configuration having a wafer-shaped varistor 82 fixed between a power contact 84 and a neutral contact 86, both consisting of a wire leading across and soldered to the varistor. The power source contact is connected on one end 88 to a power source, and on the other end 90 to a load. The power distribution system comprising a power source, load and neutral source will be more fully described in conjunction with FIG. 5. The neutral contact 86 is connected at one end 92 to a neutral side of a load and at the other end 96 to a neutral source.

In this manner, normal current flows in turn through the power source contact 84, the load and the neutral contact 86. It will be appreciated that the respective connections and contacts can be constructed such that there is virtually no change in the performance characteristics of the distribution circuit upon insertion of these components.

The power source contact 84 is connected to a first face 98 of the varistor 82, by soldering them with the contact in a U-shaped configuration to maximize the area of contact. The neutral source contact 86 is connected to a second face (not numbered but opposite 98) of the varistor 82, by soldering them also with the neutral source contact in an offset U-shaped configuration to maximize the area of contact and to present the terminals in a paired parallel fashion for fastening to a printed circuit board or otherwise to a distribution circuit.

During over-voltage events the varistor resistance decreases and the over-voltage current flows from the power source through the varistor and to a neutral source, diverting the over-voltages from the potentially sensitive load.

The only non-varistor resistance factors in the inventive voltage surge suppressor circuit of this embodiment are the solder contacts between the power contact 84, the first face 98 of the varistor 82, the neutral contact 86 and the second face respectively.

It will be appreciated that the wire interface of the varistor in this manner can also be configured in parallel and other multi-varistor configurations as described elsewhere herein.

Figure 4:
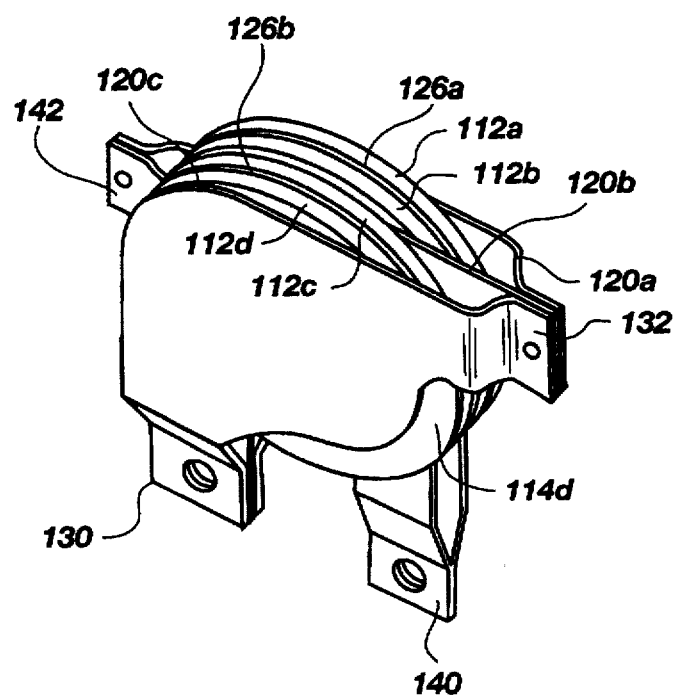
FIG. 4 is a perspective view of yet another voltage surge suppressor assembly having four varistors in parallel, made in accordance with the principles of the present invention.
Figure 5:
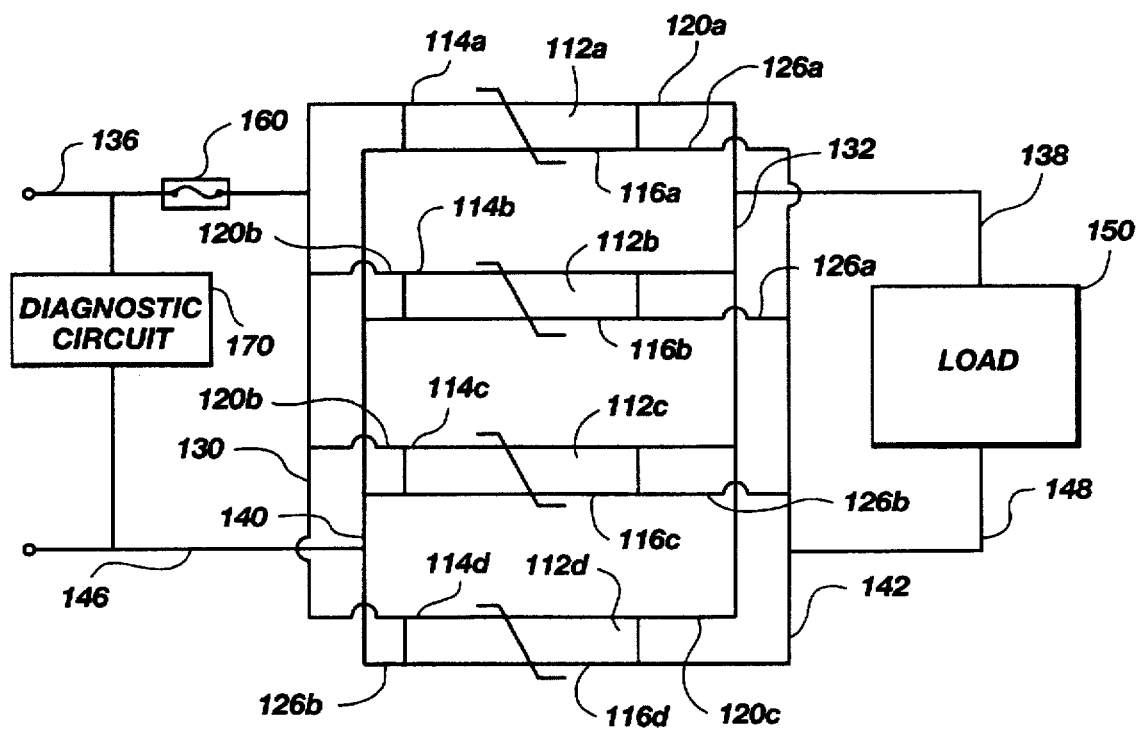
FIG. 5 is a schematic diagram of the voltage surge suppression circuit of FIG. 4.

Depicted in FIGS. 4 and 5 (in which like numbers depict like structure), is a voltage surge protective circuit configuration having four wafer-shaped varistors 112a–112d connectable to a power distribution circuit and forming parallel varistor components of a voltage surge protective circuit. Each of the varistors 112a–112d has a first planar surface 114a–114d and a second planar surface 116a–116d.

It will be appreciated that any number of varistors can be used. The number four is somewhat arbitrary. The basic analysis used is to weigh the marginal cost of each additional varistor with the marginal benefit of the specific protective application to which the circuit is to be applied. As will become more apparent, for each additional varistor added to the circuit, additional contacts are required in accordance with the following principal: the number of varistors is equal to N, and the sum of the number of power source contacts and the number of power neutral contacts is equal to N plus 1.

The first planar surfaces of the varistors are in electrical connection with the power side of the power distribution system by power source contacts 120a–120c which are disposed over the first planar surfaces 114a–114d. The first planar surfaces 114a and 114d of two of the varistors 112a and 112d respectively, are juxtaposed near the exterior of the laminate and are respectively in electrical connection with power source contacts 120a and 120c; whereas power source contact 120b is at the center of the laminate and in electrical contact with both opposing first planar surfaces 114b and 114c of varistors 112b and 112c.

A similar arrangement is made with the second planar surfaces 116a–116d of the varistors in electrical connection with the neutral contacts 126a and 126b. Neutral contact 126a is in electrical connection with second planar surfaces 116a and 116b; and neutral contact 126b is in electrical connection with second planar surfaces 116c and 116d. In such manner of shared contacts materials and space are preserved and a tight-fitting laminate is achieved by making such connections with solder as is known in the art.

The power contacts 120a–120c have two ends which overlap the varistors. These ends are combined by pressing them together and soldering them to form two common tabs 130 and 132. Tab 130 is in electrical contact with a power source line 136 (FIG. 5) and tab 132 is in electrical contact with a load source line 138 (FIG. 5).

The neutral contacts 126a and 126b also have two ends which overlap the varistors. These ends are combined by pressing them together and soldering them to form two common tabs 140 and 142. Tab 140 is in electrical contact with a neutral source line 146 (FIG. 5) and tab 142 is in electrical contact with a load source line 148 (FIG. 5). The load source line 138 is connected to the source side of a load 150 and the load neutral line 148 is connected to the neutral side of load 150 to complete a distribution circuit (all FIG. 5).

Normal power flows through the power distribution circuit and the load in a manner understood by those of ordinary skill in the art. As set forth previously, over-voltages are diverted from the load 150 (FIG. 5) by a decreased resistance in the varistors and diversion of the over-voltage current through the varistors from the source to neutral as set forth in relation to FIG. 5. Having multiple varistors in parallel, contacts in direct connection with varistor surfaces and other advantages of this and other inventive configurations are set forth elsewhere herein.

The varistors 112a–112d are of a similar wafer-like geometry. They are arranged with a common axis (FIG. 4) so as to minimize the overall space occupied by the circuit components. The adjacency of two first planar surfaces 114a–114d and two second planar surfaces 116a–116d is accomplished by alternating the orientation of the varistors with respect to those planar surfaces. This maximizes the number of shared contacts thereby minimizing the overall size of the configuration.

Combining multiple varistors in parallel allows flexibility in the performance characteristics of the protective circuit by enabling combinations of more sensitive low threshold varistors with less sensitive but higher threshold varistors. A failed low threshold varistor may fail but leave the all of other circuitry in tact exposing the load to subsequent overloads. If higher thresholds are still in tact, such as in a parallel arrangement, there is still residual (if higher threshold) over-voltage protection. Also, varistors of the same theoretical performance characteristics have variations within a given tolerance or even anomalous variations. Parallel connection of such varistors flattens out the performance and allows for actual performance closer to theoretical and design specifications. It is thus desirable to combine both similar and different performance characteristics in parallel combination. A combination providing an array of varistors in complementary parallel is thus desirable.

It will be appreciated that the contacts could be fashioned from any suitable conductive material including the conductor of the power distribution lines, to form one continuous conductor. Rigid contacts are advantageous during manufacturing because they are easy to form and handle. Rigid contacts can be fashioned from brass having a zinc content of from 20% to 35% and a copper content of from 65% to 80%.

The common fail state of a varistor is to close the surge protective circuit and thereby short the distribution line between source and neutral. It is, therefore, advantageous to fuse the circuit. It will be appreciated that a suitable fusing means will be chosen in accordance with the nature of the various applications. In the embodiment presently preferred, a fuse 160 is placed in the power source line 136 such that a circuit closure caused by a varistor failure will be opened by the fuse.

It is also advantageous to have a diagnostic circuit 170 to identify the status of the surge protective circuit. This can be as simple as a resistive bypass circuit from the power source line 136 prior to the fuse 160, to the source neutral line 146 which passes current through a light indicator such as a light emitting diode so that the diode activates when the circuit is completely closed (not depicted); to more complex diagnostic circuits known to those skilled in the art.

Figure 6:
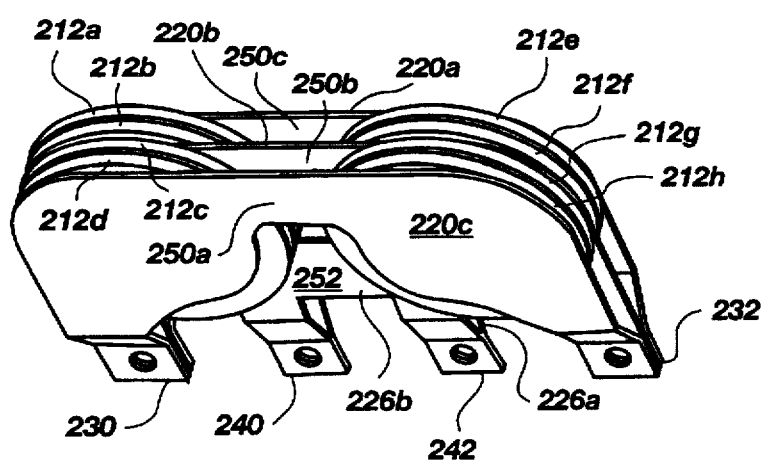
FIG. 6 is a perspective view of still another voltage surge suppressor assembly having two groups of four varistors in parallel, made in accordance with the principles of the present invention.
Figure 7:
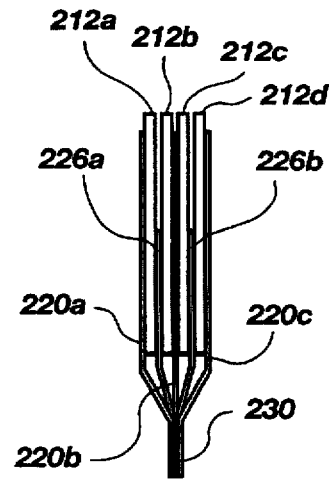
FIG. 7 is a side elevation of the voltage surge suppressor of FIG. 6.

Depicted in FIGS. 6 and 7 (in which like numbers depict like structure), is a voltage surge protective circuit configuration having eight varistors 212a–212h four parallel paired series of two. The configuration is similar to that in FIGS. 4 and 5 (with similar numbering plus 100), having first planar varistor surfaces, second planar varistor surfaces, power source contacts 220a–220c disposed over and in electrical connection with the first planar surfaces, two neutral contacts 226a and 226b disposed over and in electrical connection with the second planar surfaces, have two ends of the power contacts 220a–220c which overlap the varistors combined to form two common power tabs 230 and 232 (tab 230 in electrical contact with a power source line and tab 232 in electrical contact with a load source line), and the neutral contacts 226a and 226b with two ends which overlap the varistors to form two common neutral tabs 240 and 242 (tab 240 in electrical contact with a load neutral line and tab 242 in electrical contact with a source neutral line).

The physical space occupied by this configuration is approximately 5.2 $CM^3$, or about 16% of the space occupied by a prior art assembly of eight varistors in parallel.

It will be appreciated that any number of paired varistors can be used. The number eight is somewhat arbitrary. The basic analysis used to determine the number of varistors is set forth previously. As will become more apparent, for each additional varistor added to the circuit, additional contacts are required in accordance with the following principal: the number of varistors is equal to N and the sum of the number of power source contacts and the number of power neutral contacts is equal to N/2 plus 1.

In this embodiment the voltage surge suppression circuit is connected to a distribution circuit in the same manner as the other embodiments. During periods of normal current, the power source current flows across the first planar surfaces of the first varistors in series 212a–212c, through bridges 250a–250c in the power contacts 220a–220c, and across the first planar surfaces of the second varistors in series 212a–212h. Over-voltage current, on the other hand is re-directed through one or more varistors to the neutral line path consisting in part of the neutral contacts 226a and 226b.

Neutral contacts 226a and 226b also have bridges 252 (only one is visible and numbered but the second is complementary in structure) between the first varistors in series 212a–212c and the second varistors in series 212a–212h. The bridges 250a–250c of the power contacts 220a–220c and the bridges of the neutral contacts are juxtaposed to prevent arcing between the power contacts and the neutral contacts.

In this embodiment neutral current does not pass across the second planar surfaces of the varistors, but moves from the load to tab 240, to tab 242 and to the neutral source. This configuration allows the inventive varistor assembly to be mounted directly onto a printed circuit board and still maintain the required spacing for the voltages that the particular inventive varistor assembly is applied to, at the same time minimizing the length of any leads to the respective tabs while minimizing any resistance in over-voltage pathways.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A voltage surge suppressor in combination with a power distribution system comprising at least one power distribution line in a distribution circuit, a varistor having a planar surface in electrical connection with the distribution circuit such that electric current in the distribution circuit of voltage greater than a predetermined threshold is diverted through the varistor, wherein said electrical connection comprises direct contact between the planar surface of the varistor and the at least one power distribution line such that electric current in the distribution circuit of voltage less than the predetermined threshold flows over the planar surface of the varistor and wherein said at least one power distribution line is not aligned with another element of the distribution circuit at a periphery of the planar surface of the varistor.

2. A voltage surge suppressor as in claim 1 wherein said varistor is a metal oxide varistor.

3. A voltage surge suppressor as in claim 1 further comprising diagnostic means to indicate the status of the varistor.

4. A voltage surge suppressor as in claim 1 further comprising fuse means to open the distribution circuit upon failure of the varistor.

5. A voltage surge suppressor as in claim 4 wherein the fuse means is positioned in a source line between a power source and the electrical contact between the distribution circuit and the varistor.

6. A voltage surge suppressor as in claim 1 wherein the planar varistor surface is in electrical contact with a source line and further comprising fuse means positioned between the varistor and the source line.

7. A voltage surge suppressor as in claim 1 further comprising a plurality of varistors in parallel connection with the power distribution circuit, each varistor having a corresponding first planar surface in electrical connection with the power distribution circuit such that electric current in the power distribution circuit of voltage greater than a predetermined threshold is diverted through at least one varistor, and wherein said electrical connection comprises direct contact between each corresponding first planar surface and the at least one power distribution line such that electric current in the distribution circuit of voltage less than a predetermined threshold flows over the corresponding first planar surfaces of the plurality of varistors.

8. A voltage surge suppressor as in claim 7 wherein the plurality of varistors each have differing and complementary thresholds.

9. A voltage surge suppressor comprising:

a power source line extending from a power source to a load;

a power neutral line extending from the load to a neutral source;

a plurality of varistors each having a first planar surface and an opposing second planar surface;

a plurality of power source contacts in electrical connection with the first planar surface of each varistor such that there is a source current path over the first planar surface of each varistor during normal operation; and a plurality of power neutral contacts in electrical connection with the second planar surface of each varistor such that there is a neutral current path over the second planar surface of each varistor during normal operation, said power neutral contacts not aligned with said power source contacts at a periphery of the first and second planar surfaces.

10. A voltage surge suppressor as in claim 9 wherein said varistors are metal oxide varistors.

11. A voltage surge suppressor as in claim 10 further comprising fuse means to open the power source line upon failure of the one or more of said varistors.

12. A voltage surge suppressor as in claim 9 wherein the plurality of varistors each have a central axis orthogonal to the first and second planar surfaces, wherein each varistor has a central axis in common with at least one other varistor.

13. A voltage surge suppressor as in claim 12 wherein the plurality of varistors substantially aligned about a common central axis is equal in number to N, and the sum of the number of power source contacts and the number of power neutral contacts is equal to N plus 1.

14. A voltage surge suppressor as in claim 9 wherein said plurality of power source contacts and plurality of power neutral contacts are rigid.

15. A voltage surge suppressor as in claim 14 wherein said plurality of power source contacts and plurality of power neutral contacts comprise between 65–80% copper and 20–35% zinc.

16. A voltage surge suppressor as in claim 9 wherein said plurality of contacts are wire.

17. A voltage surge suppressor as in claim 9 further comprising diagnostic means to indicate the status of the plurality of varistors.

18. A voltage surge suppressor as in claim 9 wherein each power source contact is in electrical connection with between 40% and 95% of the first planar surface of a corresponding varistor.

19. A voltage surge suppressor as in claim 9 wherein each power neutral contact is in electrical connection with between 40% and 95% of the second planar surface of a corresponding varistor.

20. A voltage surge suppressor as in claim 9 wherein the plurality of varistors have differing and complementary over-voltage thresholds.

21. A voltage surge suppressor in combination with a power distribution circuit having a power source line, a load source line, a load neutral line, and a source neutral line, said surge suppressor comprising:

a plurality of disk-shaped metal oxide varistors having opposing first and second planar surfaces;

a plurality of source contacts having first and second opposing ends, each source contact in electrical connection with at least one corresponding first planar surface of the plurality of varistors and said first end in electrical connection with the power source line and said second end in electrical connection with the load source line such that there is a source current path over the first planar surface of each varistor;

at least one source contact laminated between and in electrical contact with two first planar varistor surfaces;

a plurality of neutral contacts in electrical connection with the second planar varistor surfaces, the load neutral line and the source neutral line; and at least one neutral contact laminated between and in electrical contact with two second planar varistor surfaces.

22. A voltage surge suppressor as in claim 21 further comprising diagnostic means to determine the status of the plurality of varistors.

23. A voltage surge suppressor as in claim 21 further comprising a fuse to open the power distribution circuit upon failure of one or more of the plurality of varistors.

24. A voltage surge suppressor as in claim 23 wherein the fuse is positioned in the power source line.

25. A voltage surge suppressor as in claim 21 wherein the plurality of varistors have differing and complementary over-voltage thresholds.

* * * * *